(12) United States Patent
Hamilton, II et al.

(10) Patent No.: US 10,542,047 B2
(45) Date of Patent: *Jan. 21, 2020

(54) SECURITY COMPLIANCE FRAMEWORK USAGE

(71) Applicant: INTERNATIONAL BUSINESS MACHINES CORPORATION, Armonk, NY (US)

(72) Inventors: Rick A. Hamilton, II, Charlottesville, VA (US); Heather M. Hinton, Austin, TX (US); Darren J. Moore, Warwick (GB); Neil Toussaint, Malvern Wells (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,901

(22) Filed: Oct. 4, 2018

(65) Prior Publication Data

US 2019/0036977 A1 Jan. 31, 2019

Related U.S. Application Data

(63) Continuation of application No. 15/726,572, filed on Oct. 6, 2017, now Pat. No. 10,135,876, which is a continuation of application No. 15/284,005, filed on Oct. 3, 2016, now Pat. No. 9,794,297.

(51) Int. Cl.
*H04L 9/32* (2006.01)
*H04L 29/06* (2006.01)

(52) U.S. Cl.
CPC .............. *H04L 63/20* (2013.01); *H04L 63/00* (2013.01); *H04L 63/08* (2013.01); *H04L 63/102* (2013.01); *H05K 999/99* (2013.01); *H04L 9/32* (2013.01)

(58) Field of Classification Search
CPC .............................................. H04L 2012/5636
See application file for complete search history.

(56) References Cited

U.S. PATENT DOCUMENTS

| 9,246,949 | B2 | 1/2016 | Kruse |
| 9,280,644 | B2 | 3/2016 | Krstic |
| 9,292,363 | B2 | 3/2016 | Laredo |
| 9,794,297 | B1 | 10/2017 | Hamilton, II |
| 9,912,703 | B1 | 3/2018 | Hamilton, II |
| 2005/0273850 | A1 | 12/2005 | Freund |
| 2010/0050229 | A1 | 2/2010 | Overby, Jr. |

(Continued)

OTHER PUBLICATIONS

Friedman, Mark J.; List of IBM Patents or Patent Application Treated as Related; Oct. 4, 2018; 1 page.

(Continued)

*Primary Examiner* — Josnel Jeudy
(74) *Attorney, Agent, or Firm* — Schmeiser, Olsen & Watts; Michael P. O'Keefe

(57) ABSTRACT

A method and system for improving usage of a security compliance framework is provided. The method includes authenticating a user for: access to the security compliance frame work, access to an authoritative source component of the compliance framework, and access to a data store component of the compliance framework. A functionality status of the security compliance framework and a request associated with contents of the data store are presented to a user via a dashboard interface. In response, the request is triggered and associated results are generated.

20 Claims, 9 Drawing Sheets

(56) References Cited

U.S. PATENT DOCUMENTS

| | | |
|---|---|---|
| 2015/0133087 A1 | 5/2015 | Stricklen |
| 2015/0269383 A1 | 9/2015 | Lang |
| 2015/0333979 A1 | 11/2015 | Schwengler |
| 2016/0012243 A1 | 1/2016 | Fielder |
| 2016/0026799 A1 | 1/2016 | Hershman |
| 2016/0197962 A1 | 7/2016 | Winn |
| 2018/0097846 A1 | 4/2018 | Hamilton, II |
| 2018/0097848 A1 | 4/2018 | Hamilton, II |

OTHER PUBLICATIONS

Josifovska, Svetlana; Queen of SIMs; IEE Review; Jan. 2004; pp. 26-27.

SECURITY COMPLIANCE FRAMEWORK USAGE

CROSS REFERENCE TO RELATED APPLICATIONS

This application is a continuation application claiming priority to Ser. No. 15/726,572 filed Oct. 6, 2017, now U.S. Pat. No. 10,135,876 issued Nov. 20, 2018, which is a continuation application claiming priority to Ser. No. 15/284,005 filed Oct. 3, 2016, now U.S. Pat. No. 9,794,297 issued Oct. 17, 2017 and related to Ser. No. 15/624,164 filed Jun. 15, 2017, now U.S. Pat. No. 9,912,703 issued Mar. 6, 2018 which is a divisional application also claiming priority to Ser. No. 15/284,005 filed Oct. 3, 2016, now U.S. Pat. No. 9,794,297 issued Oct. 17, 2017, the contents of which are hereby incorporated by reference.

FIELD

The present invention relates generally to a method for enabling a security compliance framework for usage and in particular to a method and associated system for improving security framework deployment technology by adjusting a dynamic security deployment environment for automatically utilizing a hardware/software framework.

BACKGROUND

Information technology infrastructure library (ITIL) environments associated with a large set of tools intended to manage individual aspects of service management are well known. A large number of solutions currently exist with respect to each of the tools retrieving associated processes for: identity management, access controls, logging, and monitoring key aspects of security and compliance.

Additionally, legacy data center systems are not typically designed for speed or repeatability with respect to updates to servers. Legacy data center systems may be separated from a security and a compliance point of view thereby introducing security related vulnerabilities and disconnected compliance properties However, the aforementioned solutions may be associated with each tool to retrieving its own structure for evidence of compliance and management of security thereby enabling a complicated process associated with security management may. Additionally, the aforementioned solutions enable costly processes associated with demonstration of compliance. As a result, the current solutions do not comprise an effective means for managing a single security compliance policy with respect to ITIL environments regardless of the number and types of tools involved.

Accordingly, there exists a need in the art to manage and implement information ITIL environments associated with a large set of tools.

SUMMARY

In one embodiment, the present invention provides a security compliance framework usage improvement method comprising: authenticating, by a processor of a security compliance framework, a user for access to the security compliance frame work; authenticating for the user, by the processor executing an application programming interface (API), access to an authoritative source component of the security compliance framework; authenticating for the user, by the processor via the authoritative source component, access to a data store component of the security compliance framework; presenting, by the processor via the dashboard interface, a functionality status of the security compliance framework, wherein the functionality status allows the user to request associated reports and trigger associated actions associated with monitoring a performance of servers associated with the security compliance framework and resolving associated hardware and software performance issues; triggering, by the processor based on the functionality status, the associated actions thereby executing the monitoring the performance of the servers and the resolving the associated hardware and software performance issues; generating, by the processor, a request associated with contents of the data store; presenting, by the processor executing a dashboard interface in response to the request, the contents of the data store; triggering, by the processor in response to the presenting the contents, the request; and generating, by the processor, results of the triggering the request.

In another embodiment, the present invention provides a computer program product, comprising a computer readable hardware storage device storing a computer readable program code, the computer readable program code comprising an algorithm that when executed by a processor of a security compliance framework implements a security compliance framework usage improvement method, the method comprising: authenticating, by the processor, a user for access to the security compliance frame work; authenticating for the user, by the processor executing an application programming interface (API), access to an authoritative source component of the security compliance framework; authenticating for the user, by the processor via the authoritative source component, access to a data store component of the security compliance framework; presenting, by the processor via the dashboard interface, a functionality status of the security compliance framework, wherein the functionality status allows the user to request associated reports and trigger associated actions associated with monitoring a performance of servers associated with the security compliance framework and resolving associated hardware and software performance issues; triggering, by the processor based on the functionality status, the associated actions thereby executing the monitoring the performance of the servers and the resolving the associated hardware and software performance issues; generating, by the processor, a request associated with contents of the data store; presenting, by the processor executing a dashboard interface in response to the request, the contents of the data store; triggering, by the processor in response to the presenting the contents, the request; and generating, by the processor, results of the triggering the request.

In another embodiment, the present invention provides a security compliance framework comprising a processor coupled to a computer-readable memory unit, the memory unit comprising instructions that when executed by the processor implements a security compliance framework usage improvement method comprising: authenticating, by the processor, a user for access to the security compliance frame work; authenticating for the user, by the processor executing an application programming interface (API), access to an authoritative source component of the security compliance framework; authenticating for the user, by the processor via the authoritative source component, access to a data store component of the security compliance framework; presenting, by the processor via the dashboard interface, a functionality status of the security compliance framework, wherein the functionality status allows the user to request associated reports and trigger associated actions associated with monitoring a performance of servers associated with the security compliance framework and resolving associated hardware and software performance issues; triggering, by the processor based on the functionality status, the associated actions thereby executing the monitoring the performance of the servers and the resolving the associated hardware and software performance issues; generating, by the processor, a request associated with contents of the data store; presenting, by the processor executing a dashboard interface in response to the request, the contents of the data store; triggering, by the processor in response to the presenting the contents, the request; and generating, by the processor, results of the triggering the request.

In another embodiment, the present invention provides a security compliance framework usage improvement method comprising: enforcing, by a processor of a hardware/software compliance framework, usage of an installed and deployed application programming interface (API) for security compliance in a dynamic deployment environment; authenticating, by the processor executing the API, each dynamically deployed component of the hardware/software compliance framework; assigning, by the processor executing the API, roles to each the dynamically deployed component; managing, by the processor executing the API, access to each the dynamically deployed component; and logging, by the processor executing the API, results of: the enforcing, the authenticating, the assigning, and the managing.

In another embodiment, the present invention provides a hardware/software framework comprising a processor coupled to a computer-readable memory unit, the memory unit comprising instructions that when executed by the processor implements a compliance framework usage improvement method comprising: enforcing, by the processor, usage of an installed and deployed application programming interface (API) for security compliance in a dynamic deployment environment; authenticating, by the processor executing the API, each dynamically deployed component of the hardware/software compliance framework; assigning, by the processor executing the API, roles to each the dynamically deployed component; managing, by the processor executing the API, access to each the dynamically deployed component; and logging, by the processor executing the API, results of: the enforcing, the authenticating, the assigning, and the managing.

The present invention advantageously provides a simple method and associated system capable of managing individual aspects of service management systems.

DETAILED DESCRIPTION

Figure 1:
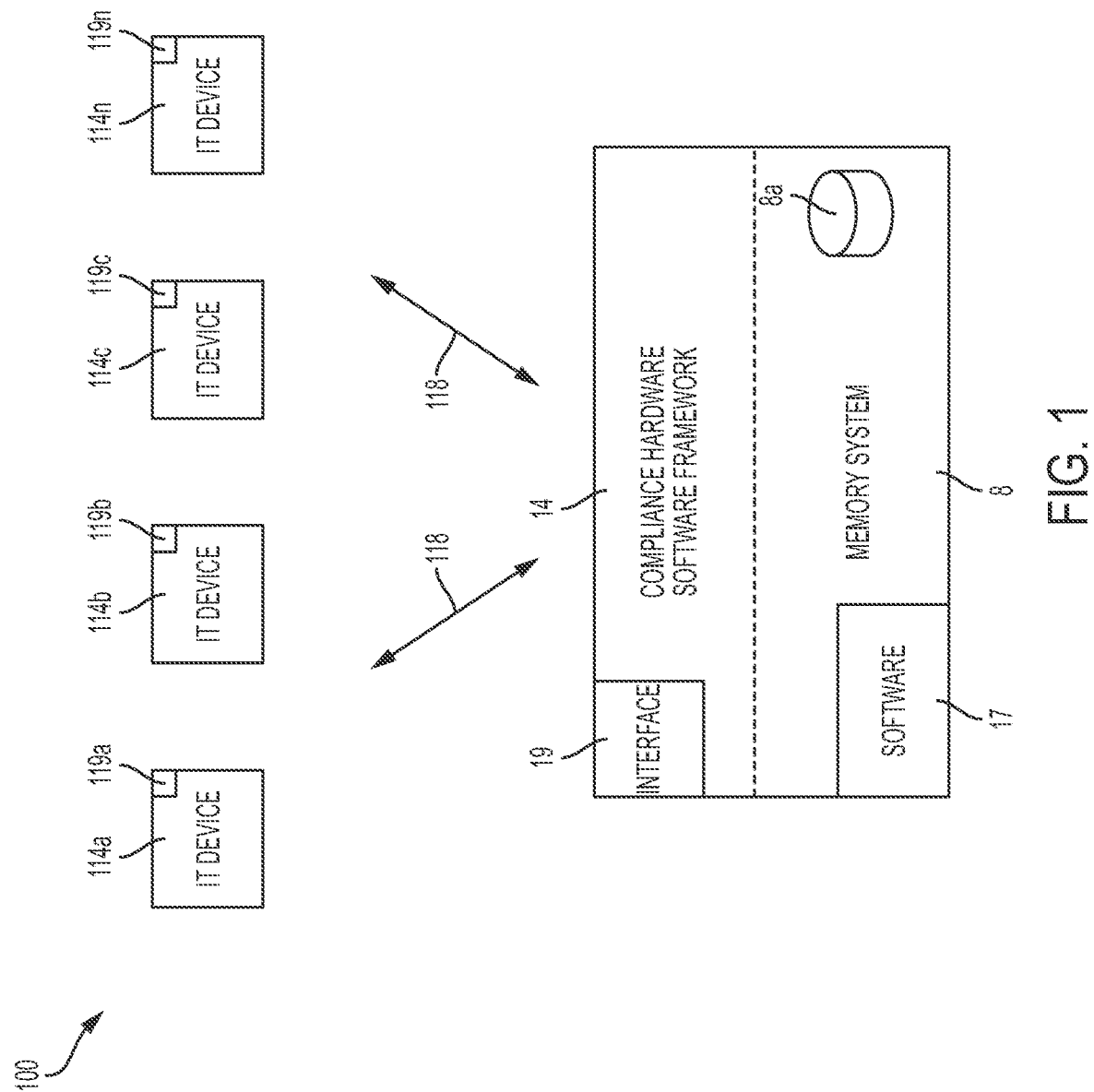
FIG. 1 illustrates a system for deploying a dynamic security deployment environment for automatically utilizing a hardware/software framework, in accordance with embodiments of the present invention.

FIG. 1 illustrates a system 100 for deploying a dynamic security deployment environment for automatically utilizing a hardware/software framework, in accordance with embodiments of the present invention. Security specific configuration management enabled for a server environment typically comprises a small subset of an overall ITIL management system. Security specific configuration management processes have matured in recent years. However, there is a critical need to enable cloud security with respect to overall ITIL management systems. Therefore, system 100 enables provisioning and usage of a modular system ensuring that all elements within a hardware/software organization are deployed with respect to a single ITIL framework such that the elements are managed with respect to a single security compliance policy independent from a number and type of tools involved in the process.

System 100 of FIG. 1 includes information technology (IT) devices 114a . . . 114n in communication with a compliance hardware/software framework 14 (providing management of servers) via a network 118. IT devices 114a . . . 114n and compliance hardware/software framework 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, IT devices 114a . . . 114n and compliance hardware/software framework 14 may each comprise a specialized hardware device(s) comprising specialized (non-generic) hardware and circuitry (i.e., specialized discrete non-generic analog, digital, and logic based circuitry) for executing a process described with respect to FIGS. 1-9. The specialized discrete non-generic analog, digital, and logic based circuitry may include proprietary specially designed components (e.g., a specialized integrated circuit such as an application specific integrated circuit (ASIC) designed for only implementing an automated process for deploying and using a dynamic security deployment environment. IT devices 114a . . . 114n comprise (associated) servers. Compliance hardware/software framework 14 includes a memory system 8 (including a data store 8a), software 17, and control hardware 19 (all sensors, interfaces, and associated control hardware for enabling software 17 to communicate with IT devices 114a . . . 114n and execute a process for deploying and using a dynamic security deployment environment). The memory system 8 may include a single memory system. Alternatively, the memory system 8 may include a plurality of memory systems. IT devices 114a . . . 114n may comprise any type of hardware devices (comprising embedded circuitry for only performing an automated process for deploying and using a dynamic security deployment environment).

System 100 of FIG. 1 enables a process for deploying and using a compliance framework (e.g., compliance hardware/software framework 14) with respect to managing security compliance in a dynamic deployment environment by installing the compliance framework for supporting security compliance in the dynamic deployment environment (e.g., a cloud environment supporting multi-tenant access). The compliance framework enables a mapping process with respect to an application programming interface (API) for security compliance in the dynamic deployment environment. The API primarily provides an improved interface to allow a normalized interface for all of the individual tools (hardware and software) and functions contained within the compliance framework. As such, the API additionally provides an improved interface for authentication, role assignment, roles, reporting, logging, and access management with respect to the compliance framework. Additionally, the dynamic deployment environment is modified to automatically utilize the installed compliance framework as exposed or embodied/via the API.

Therefore, system 100 provides deployment of a compliance framework for enabling management tools such that that all of the management tools are managed through one single interface to a single security policy thereby providing a compliance framework for allowing a single consistent and real time view of the configuration, including security posture and compliance with security and other policies, of all servers managed by the compliance framework. Additionally, IT devices 114a . . . 114n are subject to real-time automation based management such that they may be reset at any time with respect to a defined configuration standard. The compliance framework automatically manages all internal management tool components in combination with IT devices 114a . . . 114n thereby providing an improvement to security framework deployment technology. Additionally, the specialized deployment of a compliance framework provides an improvement to the compliance framework itself by increasing a speed and repeatability with respect to updates to servers. The specialized deployment of the compliance framework provides an additional improvement to the compliance framework itself by managing a single security compliance policy with respect to ITIL environments regardless of the number and types of software/hardware tools involved.

Figure 2:
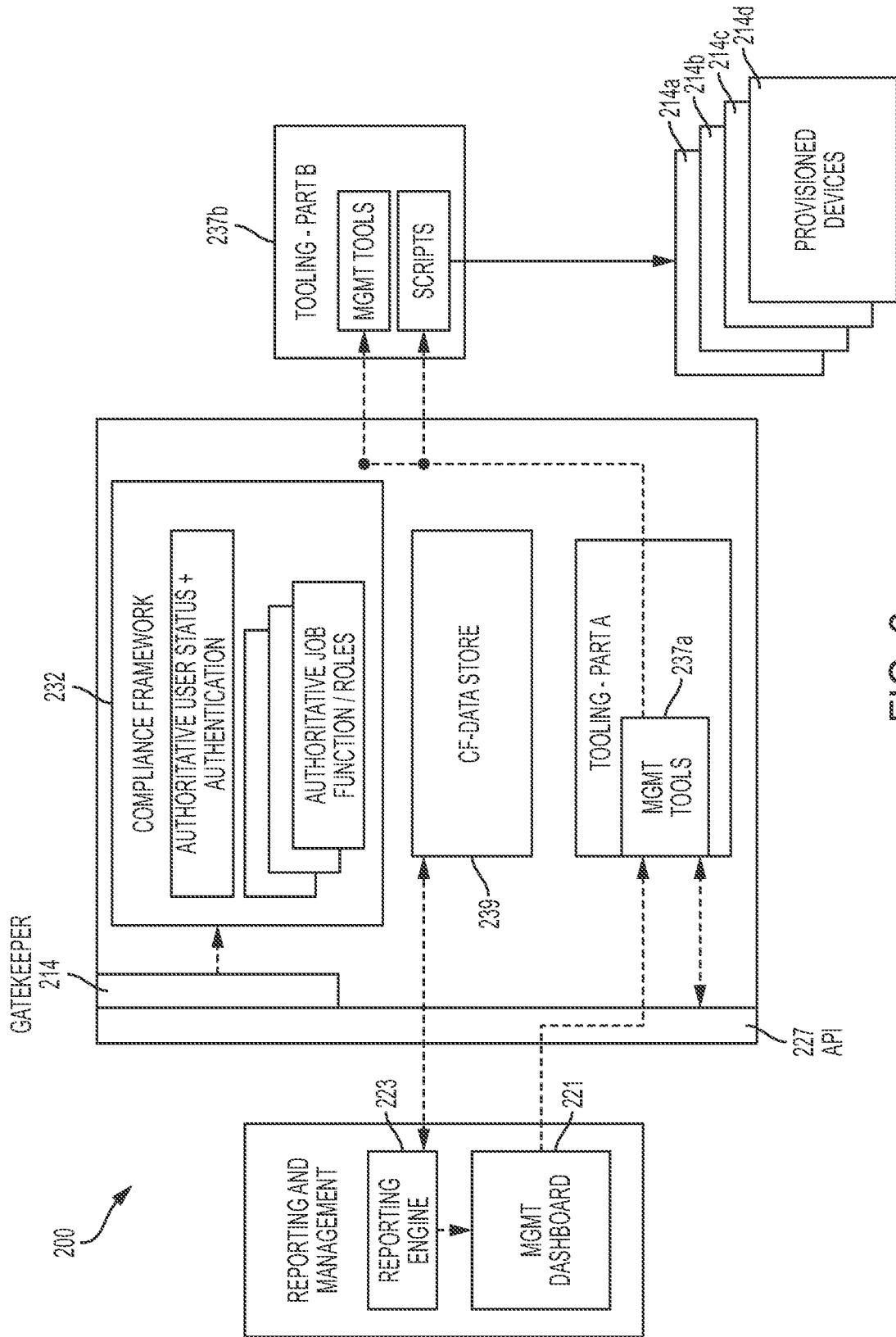
FIG. 2 illustrates a detailed view of the compliance hardware/software framework of FIG. 1, in accordance with embodiments of the present invention.

FIG. 2 illustrates a detailed view 200 of compliance hardware/software framework 14 of FIG. 1, in accordance with embodiments of the present invention. Compliance hardware/software framework 14 comprises the following components: a compliance framework data store 239, an authorization management component 232, an API component 227, a management user interface 237a and 237b, a management dashboard component 223, and a reporting engine component 223. Compliance hardware/software framework 14 automatically manages IT devices 214a . . . 214n thereby providing an improvement to security framework deployment technology.

Compliance framework data store 239 is configured to support structured and/or unstructured data. Additionally, compliance framework data store 239 comprises an authoritative source for operational management with respect to all information within compliance hardware/software framework 14. Compliance framework data store 239 comprises:
1. Feeds (to receive information via interfaces) from additional major components of system 100 of FIG. 1.
2. An interface enabling generation of canned and ah-hoc reports based on information stored internally within compliance framework data store 239.

Compliance framework data store 239 retrieves a content of data requests for storage as a record. Each record comprises recorded properties such that:
1. Each record is written as write-once, read-only.
2. Each record is time stamped with a UTC based timestamp.
3. Each record includes: a tool-source of recorded information (e.g., identified as a globally unique identifier (GUID)); a requestor based source of an action triggering information being recorded (e.g., identified as a UUID, an email address, an IP address, etc.); a unique identifier for an associated action such that multi-step actions may be correlated; a step within a sequence of an action comprised by a multi-part action (i.e., a series of steps being initiated by a user/tool in response to a management requirement).

Authorization management component 232 is configured as an authoritative source for all authentication and authorization requests. Authorization management component 232 comprises feeds to an enterprise directory providing an authoritative source for all user/employee lifecycle actions including employment status. Additionally, authorization management component 232 provides support for role based and individual privileged based authorizations.

API component 227 comprises an API based framework interface for supporting integration of the overall framework and associated internal tools with respect to management and reporting tools (e.g., management dashboard component 221 and reporting engine component 223). API component 227 may be exposed through a gatekeeper and/or orchestration layer and provide integration with management and reporting tools. Additionally, API component 227 enables tools within compliance hardware/software framework 14 to be associated with a complex management task such as, inter alia, a task requiring actions to be taken by one or more of the management tools embedded within compliance hardware/software framework 14. Additionally, API component 227 comprises an authoritative source for management user interfaces 237a and 237b.

Management user interface 237a and 237b enables an overall management process with respect to compliance hardware/software framework 14 for management of IT devices 114a . . . 114n. Additionally, external tools (e.g., management dashboard component 221) are related to associated permissions for interaction with the compliance framework. Management user interface 237a and 237b comprise management interfaces embedded within compliance hardware/software framework 14.

Management dashboard component 221 enables a continuous compliance model enabled through compliance hardware/software framework 14 by providing a real-time view of the security and compliance status of IT devices 114a-114n within the framework via the information contained in compliance framework data store 239.

Reporting engine component 223 enables a comprehensive compliance management environment visualized and reported via reporting engine component 223. Reporting engine component 223 provides visualization of an overall continuous compliance status enabled through compliance hardware/software framework 14.

Components of compliance hardware/software framework 14 are configured and deployed as follows:

Compliance framework data store 239 is deployed in association with an architectural configuration with respect to high availability (i.e., a quality of a system or component that assures a high level of operational performance for a given period of time) and disaster recovery (i.e., a set of policies and procedures to enable the recovery or continuation of vital technology infrastructure and systems following a natural or human-induced disaster) strategies. The compliance framework data store 239 is configured to only accept write requests from known pre-identified sources.

Authorization management component 232 is deployed in association with an architectural configuration with respect to high availability and disaster recovery strategies. Authorization management component 232 is configured to log all events to a local authorization data store to create a compliance framework record to be written to events to the local authorization data store for every authorization request and associated status (e.g., granted, denied, etc.). A bootstrap generated for the local authorization data store is configured with credentials allowing API servers to interact with IT devices 114a-114n managed by compliance hardware/software framework 14 using API keys and tokens allowing API interaction with the components. An additional bootstrap generated for the local authorization data store is configured with credentials allowing management user interface 237a and 237b to interact with components of compliance hardware/software framework 14. Default profiles for roles and permissions associated with authorization management component 232 are configured.

API component 227 is deployed in association with an architectural configuration with respect to high availability and global availability strategies. The API component 227 is configured to write a copy of all API requests to compliance framework data store 239. API component 227 may include a firewall or gateway router based aspect that only allows known, approved requests to pass to the compliance framework management tools. Additional routing may be put in place to prevent any direct access to the management tools that does not come from the API interface tools.

Two or more management tools (optionally deployed in a master-servant configuration such as management user interface tools 237a and 237b as illustrated in FIG. 2) are deployed in association with an architectural configuration with respect to high availability and global availability strategies. Management user interface tools 237a and 237b are configured with API keys and tokens necessary for allowing compliance hardware/software framework 14 to programmatically invoke the management actions provided by management user interface tools 237a and 237b where such management actions include improved: security hardware/software configuration, system patching, performance monitoring, etc.

Management dashboard component 221 is deployed in association with an architectural configuration with respect to high availability and disaster recovery strategies. Management dashboard component 221 is configured to use API component 227 including required API keys/passwords necessary to authenticate requests from management user interface 237a and 237b with respect to components of compliance hardware/software framework 14.

Reporting engine component 223 is deployed in association with an architectural configuration with respect to high availability and disaster recovery strategies.

Tools within management user interface 237a and 237b are deployed and configured for compliance hardware/software framework 14. For each tool to be configured within compliance hardware/software framework 14, both the tool and compliance hardware/software framework 14 must be enabled as follows:

API end-points are identified and the API is configured to accept message transfer agent (MTA) API calls. Additionally, the API is configured to enrich and copy a request to the compliance hardware/software framework 14, broker an authorization for the request, provide MTA specific passwords/keys for the direct MTA request, and forward the request to the MTA. Optionally, an expected task completion time may be configured for each MTA request such that a triggered revalidation of the targeted endpoint may be initiated to ensure that there have been no changes to the targeted endpoint's expected configuration and profile.

A management tool of management user interface 237a is configured to disable all individual user accounts and re-enable with new content framework provided passwords that are never provided to individual users. An API based service account is set up for use by compliance hardware/software framework 14 when invoking the management tool for compliance hardware/software framework 14 brokered actions. The service account may include an API key or password/token known only to authorization management component 232.

Targeted endpoints (or servers) are deployed for management by compliance hardware/software framework 14. For each targeted endpoint currently managed by tools outside of compliance hardware/software framework 14 as well as new endpoints added to the managed environment, a server is enabled for management by compliance hardware/software framework 14 only.

Deployed components of compliance hardware/software framework 14 are configured for usage as described in the following example:

Compliance hardware/software framework 14 is enabled for authenticating a user via management dashboard component 221. The authentication process enables management dashboard component 221 to receive a user's user name/password as well as additional authentication information and request authentication from authorization management component 232 via API component 227. In response, API component 227: invokes a back end authentication procedure with respect to authorization management component 232; logs an authorization request (i.e., without password/authentication tokens and via API component 227) to compliance framework data store 239; and retrieves and logs an authorization response to compliance framework data store 239. Optionally, a role/profile may be generated for if required for downstream requests associated with management tools.

Additionally, a user is presented with a role-specific view of a management dashboard (presented via management dashboard component 221) for: determining a status of the environment, requesting reports, and triggering actions independently or in response to report information. For example, a user may request a static report associated with all deployed software (including version #s) on all servers in a given group. In response, the management dashboard builds a request for generating a requested report associated with data hosted by compliance framework data store 239. Compliance framework data store 239 may include multiple types of data and log reports for actions executed with respect to compliance hardware/software framework 14.

Management dashboard component 221 and reporting engine component 223 transmit a request to compliance framework data store 239 (via API component 227) for building a report based on the user request. Additionally, API component 227 transmits a request (to authorization management component 232) for authenticating the request itself. If the request is authenticated, API component 227 will transmit a request (to authorization management component 232) for authorizing the user based on tokens and/or identifiers included with request and/or roles/privileges gathered at the time of request. If the user is authorized, API component 227 will transmit the request to compliance framework data store 239 for initializing a report data gathering process and all associated actions are logged to management dashboard component 221 and compliance framework data store 239. Management dashboard component 221 presents the report. The aforementioned steps are repeated with respect to additionally requested real time reports.

When a new IT asset (e.g., one of IT devices 114a . . . 114n of FIG. 1) is added to the environment (i.e., system 100 of FIG. 1), a server is added to a list of known servers within compliance hardware/software framework 14. The aforementioned process may be executed manually (via management dashboard component 221) or via a specialized management functionality associated with an instance of management user interface 237a and 237b that is responsible for the scanning, locating, and notification of new servers (i.e., IT devices 114a . . . 114n). When a new server is located, it is registered with compliance hardware/software framework 14, enabled for management by management user interface 237a and 237b, reported on by management dashboard component 221, and logged against compliance framework data store 239. Additionally, the associated server is configured by compliance hardware/software framework 14 such that the server is managed by compliance hardware/software framework 14.

Compliance hardware/software framework 14 allows for:
1. Improved hardware/software security functionality such that a user is unable to authenticate to any software/hardware tool when the user is removed from an enterprise registry.
2. Improved forensics abilities with respect to enabling a faster forensic process in response to an incident. For example, a user's software access permissions not being updated properly may lead to over privilege rights. As an additional example, if a user requires changes to the hardware or software configuration of a server for emergency management purposes (such as uploading a patch or downloading a system dump), compliance hardware/software framework 14 may:
a. Determine which user enabled the changes.
b. Tie the action to a known service management/workflow ticket approving such an action.
c. Force the hardware or software re-setting of a server to a proper configuration to ensure continued compliance with a defined security posture (e.g., telnet is not enabled).
3. Improved compliance as an organization will always have a real-time view into the actions taken against a server and the server's hardware software configuration.
4. Improved security posture/reduced risk due to misuse by users as organization may prove that users were removed in a timely manner.

Compliance hardware/software framework 14 comprises a modular system that ensures that all elements within an organization are deployed within a single security framework. Therefore, all of the elements are managed by a single security compliance policy, regardless of a number and type of tools involved with securing the environment. Additionally, a single security framework including necessary components and framework structure is generated for managing a single or set of security policies with a single view of the compliance of the environment with these policies, regardless of the number and types of tools involved in securing the environment.

Figure 3:
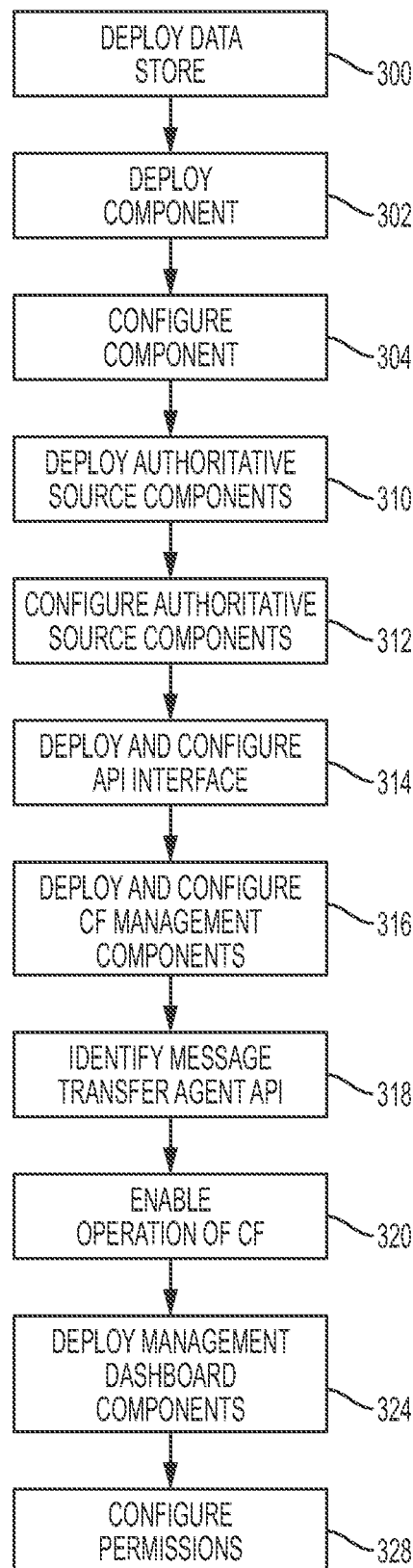
FIG. 3 illustrates an algorithm detailing a process flow enabled by the system of FIG. 1 for deploying a dynamic security deployment environment for automatically utilizing a hardware/software framework, in accordance with embodiments of the present invention.

FIG. 3 illustrates an algorithm detailing a process flow enabled by system 100 of FIG. 1 for deploying a dynamic security deployment environment for automatically utilizing a hardware/software framework, in accordance with embodiments of the present invention. Each of the steps in the algorithm of FIG. 3 may be enabled and executed in any order by a computer processor(s) or any type of specialized hardware executing computer code. In step 300, a data store comprising an authoritative source of information comprising configuration and operational management requirements associated with IT devices is deployed. The data store may be configured such that the data store is only configured to accept write requests from pre-identified hardware sources of the compliance framework. Additionally, a content framework password for a hardware/software tool for use with the content framework may be enabled. The content framework password is unknown by a user of the content framework. In step 302, a (specialized hardware) component comprising an interface for an authoritative source configured to provide authentication and authorization for access to servers of the IT devices is deployed. In step 304, the component is configured for enabling authentication and privilege management for access to authoritative source components that include the IT devices. In step 310, the authoritative source components are deployed. In step 312, the authoritative source components are configured for logging security events to a source component data store. The authoritative source components are configured by:
1. Initializing first credentials for allowing application programming interface (API) servers to interact with compliance framework components of the compliance framework.
2. Initializing second credentials for allowing the compliance framework to interact with the compliance framework components and accepting default profiles comprising authorization permission.

In step 314, an API interface is deployed and configured. Deploying and configuring the API interface may include:
1. Deploying API components of the API interface with respect to the IT devices (i.e., managed IT devices). The API components may include a gateway based router configuration for allowing only approved requests to communicate with tools of the compliance framework.
2. Configuring the API interface to write copies of API requests to the data store.

In step 316, compliance framework management components (including user interface components are deployed and configured by:
1. Associating the user interface components with execution keys and associated tokens of the API interface.
2. Configuring (via the user interface components) the authoritative source components with respect to specified permission for interaction with the content framework.

In step 318, message transfer agent API endpoint components of the compliance framework are identified. The API endpoint components may be associated with a message transfer agent and a task completion time for each request associated with the message transfer agent may be determined. In step 320, operation of the compliance framework is enabled with respect to the data store, the authoritative source components, the API interface, the compliance framework management components, and the API endpoint components. In step 324, management dashboard components are deployed. The management dashboard components may include an architectural configuration associated with the IT devices. Additionally, reporting engine components may be deployed. The reporting engine components may include an architectural configuration associated with the IT devices. In step 328, specified permissions for interaction with the content framework for a hardware/software tool for use with the API interface are configured.

Figure 4:
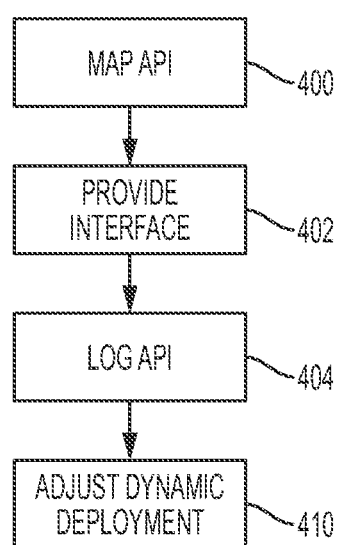
FIG. 4 illustrates an algorithm detailing a process flow enabled by the system of FIG. 1 for deploying and managing a security compliance framework, in accordance with embodiments of the present invention.

FIG. 4 illustrates an algorithm detailing a process flow enabled by system 100 of FIG. 1 for deploying and managing a security compliance framework, in accordance with embodiments of the present invention. Each of the steps in the algorithm of FIG. 4 may be enabled and executed in any order by a computer processor(s) or any type of specialized hardware executing computer code. In step 400, mapping an application programming interface (API) is mapped for security compliance with respect to a dynamic deployment environment. The mapping process is executed by a hardware/software framework for supporting security compliance in the dynamic deployment environment. The dynamic deployment environment may include a cloud environment supporting multi-tenant access. The API may be configured to automatically prevent access by a user to each dynamically deployed component of the hardware/software framework. In step 402, an interface for authentication, role assignment, roles, reporting, logging, and access management are provided for the hardware/software framework via the API. In step 404 each instance of the API is logged by the hardware/software framework. In step 410, the dynamic deployment environment is adjusted for automatically utilizing the hardware/software framework.

Figure 5:
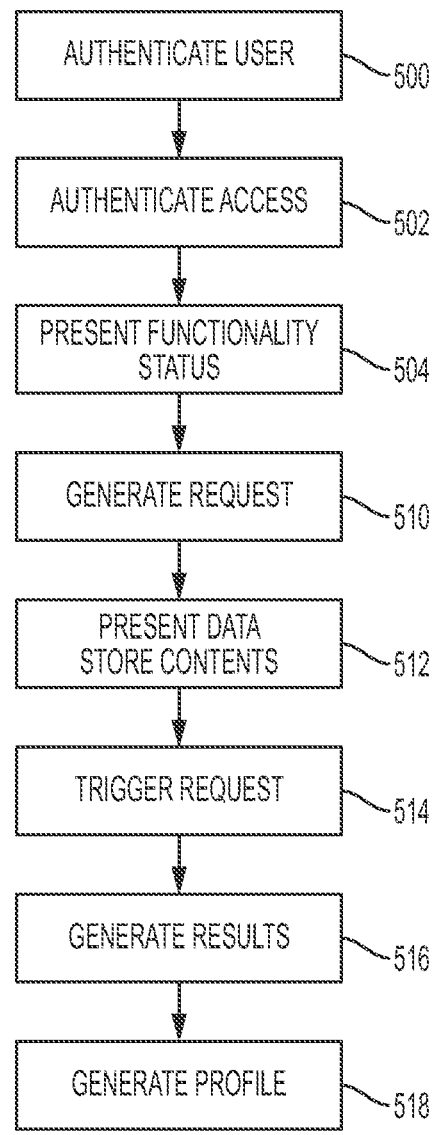
FIG. 5 illustrates an algorithm detailing a process flow enabled by the system of FIG. 1 for automatically utilizing a hardware/software framework in a deployed dynamic security deployment environment, in accordance with embodiments of the present invention.

FIG. 5 illustrates an algorithm detailing a process flow enabled by system 100 of FIG. 1 for automatically utilizing a hardware/software framework in a deployed dynamic security deployment environment, in accordance with embodiments of the present invention. Each of the steps in the algorithm of FIG. 5 may be enabled and executed in any order by a computer processor(s) or any type of specialized hardware executing computer code. In step 500, a user is authenticated for: access to a security compliance framework. In step 502, the user is authenticated for access to: an authoritative source component of the security compliance framework and a data store component of the security compliance framework. Authenticating access to the data store component may include:
1. Recording an authentication attempt associated with the authentication.
2. Recording an authentication request associated with the authentication.
3. Logging a status of the authentication request.

In step 504, a functionality status of the security compliance framework is presented to the user via a dashboard interface. The functionality status allows a user to request associated reports and trigger associated actions associated with monitoring a hardware or software performance of servers associated with the security compliance framework and resolve associated performance issues. In step 510, a request associated with contents of the data store is generated. The request may be generated by:
1. Authenticating the user with respect to the request.
2. Passing the request to the data store based on results of authenticating the user with respect to the request.

In step 512, contents of the data store are presented to the user via the dashboard interface. In step 514, the request is triggered in response to presenting the contents. In step 516, results of triggering the request are generated. Triggering the request may include:
1. Authenticating the request.
2. Authorizing the user with respect to the request.
3. Passing the request to software and hardware tools via an API.

In step 518, a secure profile for the user is generated based on the authentication of step 502.

Figure 6:
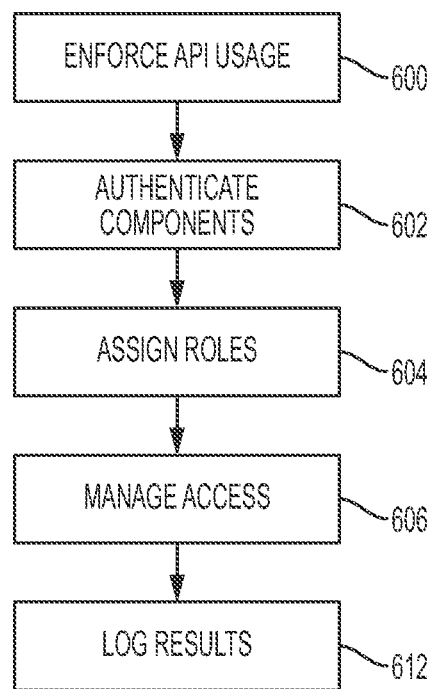
FIG. 6 illustrates an algorithm detailing a process flow enabled by the system of FIG. 1 for automatically improving usage of a hardware/software framework in a dynamic security deployment environment, in accordance with embodiments of the present invention.

FIG. 6 illustrates an algorithm detailing a process flow enabled by system 100 of FIG. 1 for automatically improving usage of a hardware/software framework in a dynamic security deployment environment, in accordance with embodiments of the present invention. Each of the steps in the algorithm of FIG. 6 may be enabled and executed in any order by a computer processor(s) or any type of specialized hardware executing computer code. In step 600, usage of an installed and deployed application programming interface (API) is enforced (by a hardware/software compliance framework) for security compliance in a dynamic deployment environment. The dynamic deployment environment may include a cloud environment supporting multi-tenant access. The API may be configured to automatically prevent access by a user to each dynamically deployed component of the hardware/software framework. In step 602, each dynamically deployed component of the hardware/software compliance framework is authenticated. In step 604, roles are assigned to to each dynamically deployed component. In step 606, access to each dynamically deployed component is managed. In step 612, results of steps 600-606 are logged.

Figure 7:
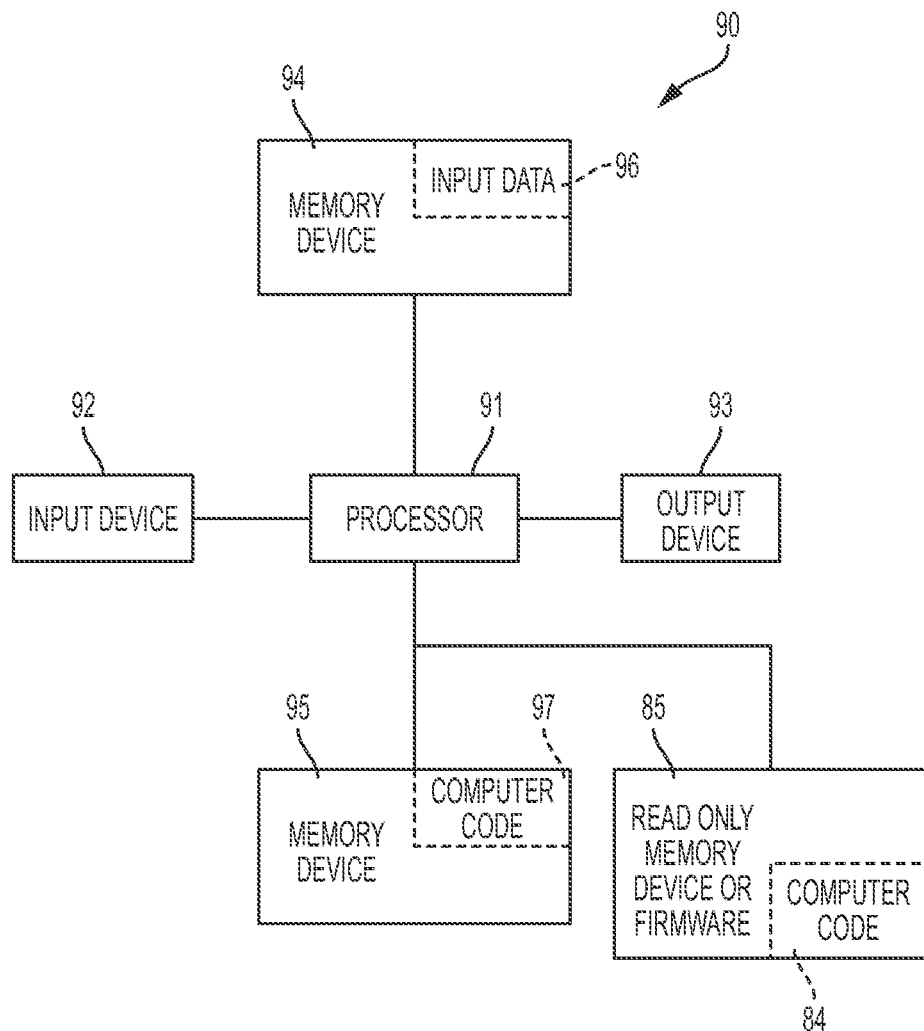
FIG. 7 illustrates a computer system used by the system of FIG. 1 for enabling a process for automatically improving usage of a hardware/software framework in a dynamic security deployment environment, in accordance with embodiments of the present invention.

FIG. 7 illustrates a computer system 90 (e.g., IT devices 114a . . . 114n and compliance hardware/software framework 14) used by or comprised by the system of FIG. 1 for automatically utilizing a hardware/software framework in a deployed dynamic security deployment environment, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3-6) for enabling a process for automatically utilizing a hardware/software framework in a deployed dynamic security deployment environment. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIGS. 3-6) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 3-6) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for automatically utilizing a hardware/software framework in a deployed dynamic security deployment environment. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for automatically utilizing a hardware/software framework in a deployed dynamic security deployment environment. In another embodiment, the invention provides a business method that performs the process steps of the invention on a subscription, advertising, and/or fee basis. That is, a service supplier, such as a Solution Integrator, could offer to enable a process for automatically utilizing a hardware/software framework in a deployed dynamic security deployment environment. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
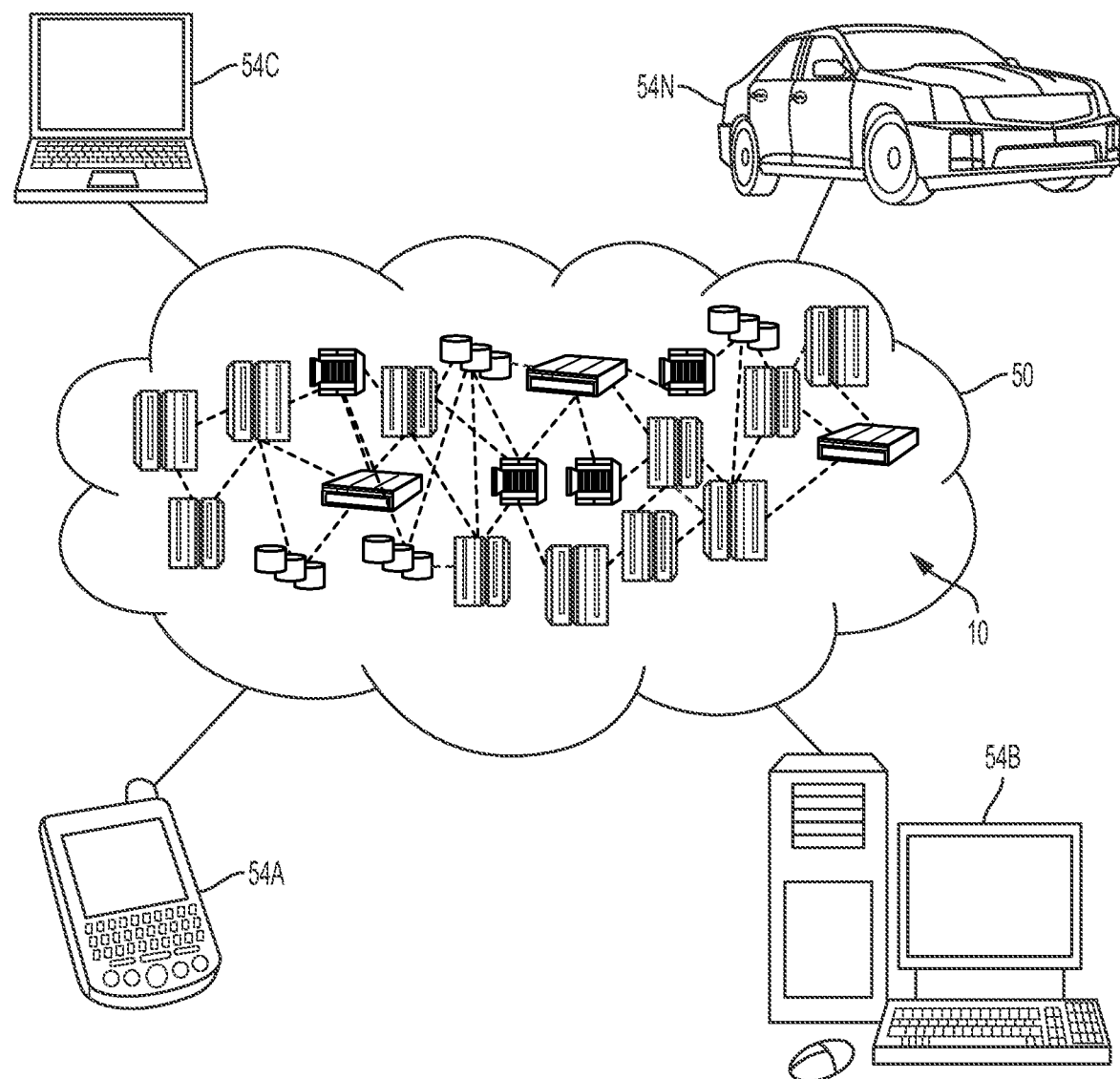
FIG. 8 illustrates a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
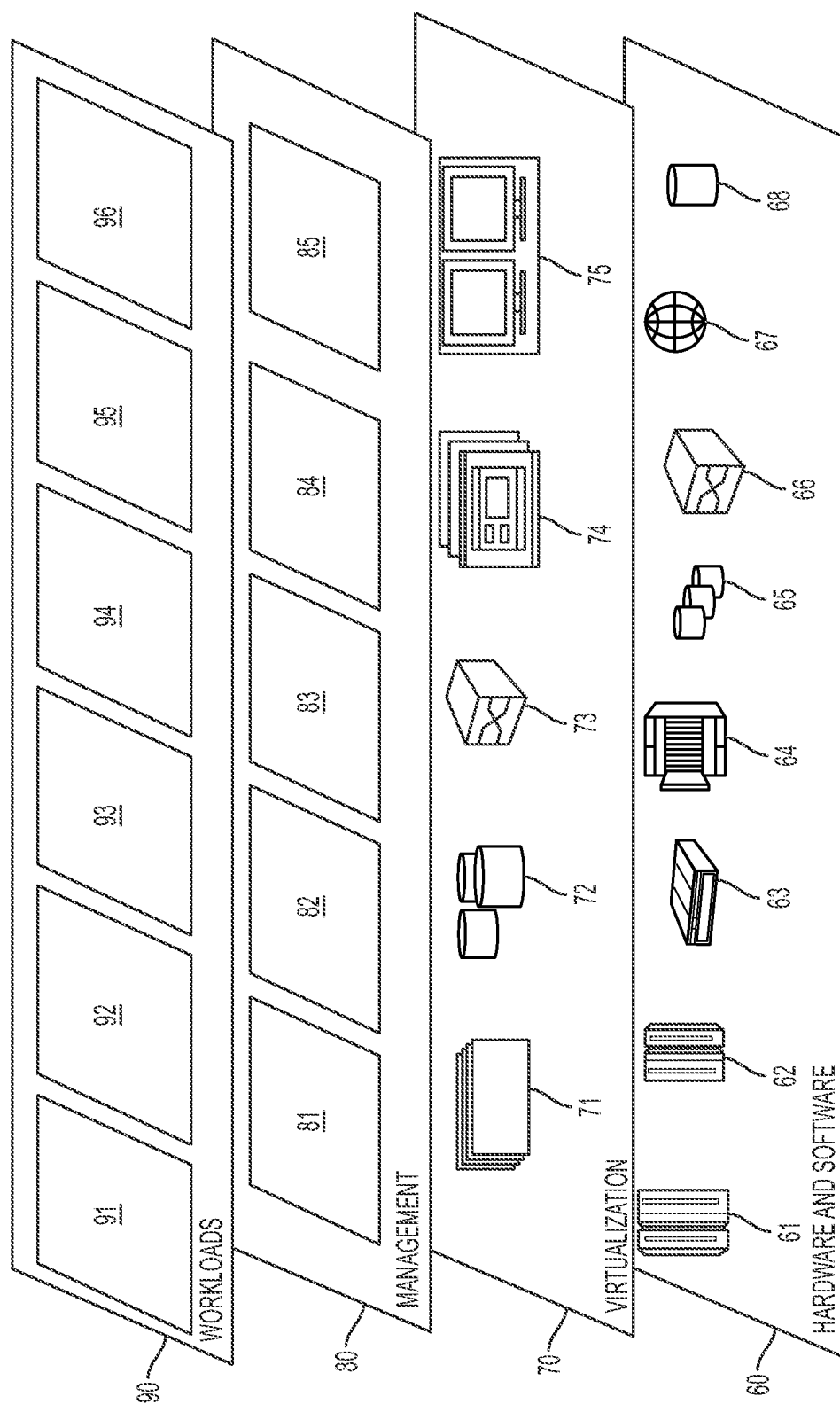
FIG. 9 illustrates a set of functional abstraction layers provided by cloud computing environment, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatically utilizing a hardware/software framework in a deployed dynamic security deployment environment.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A security compliance framework usage improvement method comprising:

presenting via a dashboard interface, by a processor of a security compliance framework executing an application programming interface (API), a functionality status of said security compliance framework, wherein said functionality status allows said user to request associated reports and trigger associated actions associated with monitoring a performance of servers associated with said security compliance framework and resolving associated hardware and software performance issues;

triggering, by said processor based on said functionality status, said associated actions thereby executing said monitoring said performance of said servers and said resolving said associated hardware and software performance issues;

generating, by said processor, a request associated with contents of a data store component of said security compliance framework;

presenting, by said processor executing a dashboard interface in response to said request, said contents of said data store component;

triggering, by said processor in response to said presenting said contents, said request; and generating, by said processor, results of said triggering said request.

2. The method of claim 1, wherein authenticating said user comprises authorizing said user for access to said security compliance frame work via said dashboard interface.

3. The method of claim 1, wherein authenticating access to said data store component comprises:
recording an authentication attempt associated with said authenticating said access to said data store component;
recording an authentication request associated with said authenticating said access to said data store component; and
logging a status of said authentication request.

4. The method of claim 1, further comprising:
generating, by said processor based on authenticating access to said data store component, a secure profile for said user.

5. The method of claim 1, wherein said generating said request associated with said contents of said data store component comprises:
authenticating said user with respect to said request; and
passing said request to said data store component based on results of said authenticating said user with respect to said request.

6. The method of claim 1, wherein said triggering said request comprises:
authenticating said request;
authorizing said user with respect to said request; and
passing said request, via said API, to software and hardware tools.

7. The method of claim 1, wherein authorizing said user with respect to said request comprises execution of security tokens.

8. The method of claim 1, further comprising:
providing at least one support service for at least one of creating, integrating, hosting, maintaining, and deploying computer-readable code in the hardware device, said code being executed by the computer processor to implement: said presenting said functionality status, said triggering said associated actions, said generating said request, said presenting said contents of said data store component, said triggering said request, and said generating said results of said triggering said request.

9. A computer program product, comprising a computer readable hardware storage device storing a computer readable program code, said computer readable program code comprising an algorithm that when executed by a hardware processor of a security compliance framework implements a security compliance framework usage improvement method, said method comprising:
presenting via a dashboard interface, by said hardware processor executing an application programming interface (API), a functionality status of said security compliance framework, wherein said functionality status allows said user to request associated reports and trigger associated actions associated with monitoring a performance of servers associated with said security compliance framework and resolving associated hardware and software performance issues;
triggering, by said hardware processor based on said functionality status, said associated actions thereby executing said monitoring said performance of said servers and said resolving said associated hardware and software performance issues;
generating, by said hardware processor, a request associated with contents of a data store component of said security compliance framework;
presenting, by said hardware processor executing a dashboard interface in response to said request, said contents of said data store component;
triggering, by said hardware processor in response to said presenting said contents, said request; and
generating, by said hardware processor, results of said triggering said request.

10. The computer program product of claim 9, wherein authenticating said user comprises authorizing said user for access to said security compliance frame work via said dashboard interface.

11. The computer program product of claim 9, wherein authenticating access to said data store component comprises:
recording an authentication attempt associated with said authenticating said access to said data store component;
recording an authentication request associated with said authenticating said access to said data store component; and
logging a status of said authentication request.

12. The computer program product of claim 9, wherein said method further comprises:
generating, by said hardware processor based on authenticating access to said data store component, a secure profile for said user.

13. The computer program product of claim 9, wherein said generating said request associated with said contents of said data store component comprises:
authenticating said user with respect to said request; and
passing said request to said data store based on results of said authenticating said user with respect to said request.

14. The computer program product of claim 9, wherein said triggering said request comprises:
authenticating said request;
authorizing said user with respect to said request; and
passing said request, via said API, to software and hardware tools.

15. The computer program product of claim 9, wherein said authorizing said user with respect to said request comprises execution of security tokens.

16. A security compliance framework comprising a hardware processor coupled to a computer-readable memory unit, said memory unit comprising instructions that when executed by the processor implements a security compliance framework usage improvement method comprising:
presenting via a dashboard interface, by said hardware processor executing an application programming interface (API), a functionality status of said security compliance framework, wherein said functionality status allows said user to request associated reports and trigger associated actions associated with monitoring a performance of servers associated with said security compliance framework and resolving associated hardware and software performance issues;
triggering, by said hardware processor based on said functionality status, said associated actions thereby executing said monitoring said performance of said servers and said resolving said associated hardware and software performance issues;
generating, by said hardware processor, a request associated with contents of a data store component of said security compliance framework;
presenting, by said hardware processor executing a dashboard interface in response to said request, said contents of said data store component;
triggering, by said hardware processor in response to said presenting said contents, said request; and
generating, by said hardware processor, results of said triggering said request.

17. The security compliance framework of claim 16, wherein authenticating said user comprises authorizing said user for access to said security compliance frame work via said dashboard interface.

18. The security compliance framework of claim 16, wherein authenticating access to said data store component comprises:
    recording an authentication attempt associated with said authenticating said access to said data store component;
    recording an authentication request associated with said authenticating said access to said data store component; and
    logging a status of said authentication request.

19. The security compliance framework of claim 16, wherein said method further comprises:
    generating, by said hardware processor based on authenticating access to said data store, a secure profile for said user.

20. The security compliance framework of claim 16, wherein said generating said request associated with contents of said data store comprises:
    authenticating said user with respect to said request; and
    passing said request to said data store based on results of said authenticating said user with respect to said request.

* * * * *